April 18, 1967  L. G. KILMER  3,314,497
GAS EXPLODER SEISMIC ENERGY SOURCE
Filed Oct. 7, 1963  2 Sheets-Sheet 1

INVENTOR
LAUREN G. KILMER
BY
McLean and Boustead
ATTORNEYS

April 18, 1967 L. G. KILMER 3,314,497
GAS EXPLODER SEISMIC ENERGY SOURCE
Filed Oct. 7, 1963 2 Sheets-Sheet 2

INVENTOR.
LAUREN G. KILMER
BY
*McLean and Boustead*
ATTORNEYS

United States Patent Office 3,314,497
Patented Apr. 18, 1967

3,314,497
GAS EXPLODER SEISMIC ENERGY SOURCE
Lauren G. Kilmer, Tulsa, Okla., assignor to Sinclair Research, Inc., New York, N.Y., a corporation of Delaware
Filed Oct. 7, 1963, Ser. No. 314,230
8 Claims. (Cl. 181—.5)

This application is a continuation-in-part of application Ser. No. 187,111, filed Apr. 12, 1962 now Patent No. 3,235,027.

My invention relates to geophysical prospecting and in particular provides a device for imparting a compressive impulse at the earth's surface.

As described in my co-pending application Ser. No. 187,111, filed Apr. 12, 1962, now Patent No. 3,235,027 a gas explosion confined in an expansible chamber acting at the earth-air interface against a large mass positioned above such gas explosion can be utilized to impart a compressive impulse to the surface of the earth beneath the gas explosion thereby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the impulse imparted to the surface of the earth has a high energy content and can be made of extremely short duration.

I have found that all of the useful energy imparted to the earth in such a device occurs at the moment of the explosion before there is any significant upward movement of the top of the device occuring as a result of the explosion. It is therefore feasible to vent the chamber in which the explosion is confined the moment vertical extension of the sidewalls occurs. It is apparent, however, that some vertical movement of the sidewall must be permissible in order that the energy of the explosion can be transmitted into the earth. It is accordingly unnecessary to construct a device of this type, which for convenience I will call a gas exploder, to accommodate large vertical extensions of the sidewall. It is essential, however, that the sides of the gas exploder remain sealed, as the top extends upwardly, in order to prevent escape of exploding gases through the sides which might result in the generation of an air wave and thereby interfere with the detection of the desired seismic wave.

With these precepts in mind I have now found that a highly effective side-seal for a gas exploder can be provided without the necessity of forming a sidewall as a unitary structure, such as a bellows, or alternatively of forming a sidewall of tightly fitting, relatively slidable members. Thus in accordance with my present invention a gas exploder for propagating a seismic wave can be constructed having a rigid top and a rigid bottom which when at rest are so constructed as to form a chamber between them in which a gas explosion can take place but which are joined together such that relative vertical movement can take place between them. Such vertical movement is, however, preferably limited by a resilient fastening holding the top and bottom biased together. Internally I provide a dynamic seal positioned inside of, that is, on the inner side of, and adjacent the clearances at the joint between the top and bottom of the gas exploder. The seal is in the form of a ring of resilient material which is thicker than any possible opening of the clearances at the joint between the top and bottom of the gas exploder such that when a gas is exploded within the exploder the sealing ring is pressed against the clearances of the joint.

Preferably the top is so constructed that it normally seats on the sealing ring thus providing a resilient cushion for the top to minimize the generation of a second impulse at the surface of the earth after an explosion when the top falls back to its rest position upon release of the exploded gas in the exploder. Preferably also the top and bottom of the gas exploder form a telescoping joint about their sides in order that the clearances of the joint between the top and bottom can be sufficiently limited to prevent extrusion of the resilient sealing ring outwardly of the clearances of such joint. Preferably also, in order that the resilient fastening which biases the top and bottom of the exploder together be not overly strained, a valving arrangement should be employed to release the force of the exploded gas simultaneously as relative movement between the top and bottom of the exploder occurs. This is also desirable particularly where several explosions are required at a given location as pointed out in my above noted co-pending application.

For a more complete understanding of the practical application of my invention reference is made to the appended drawings in which.

Figure 1:
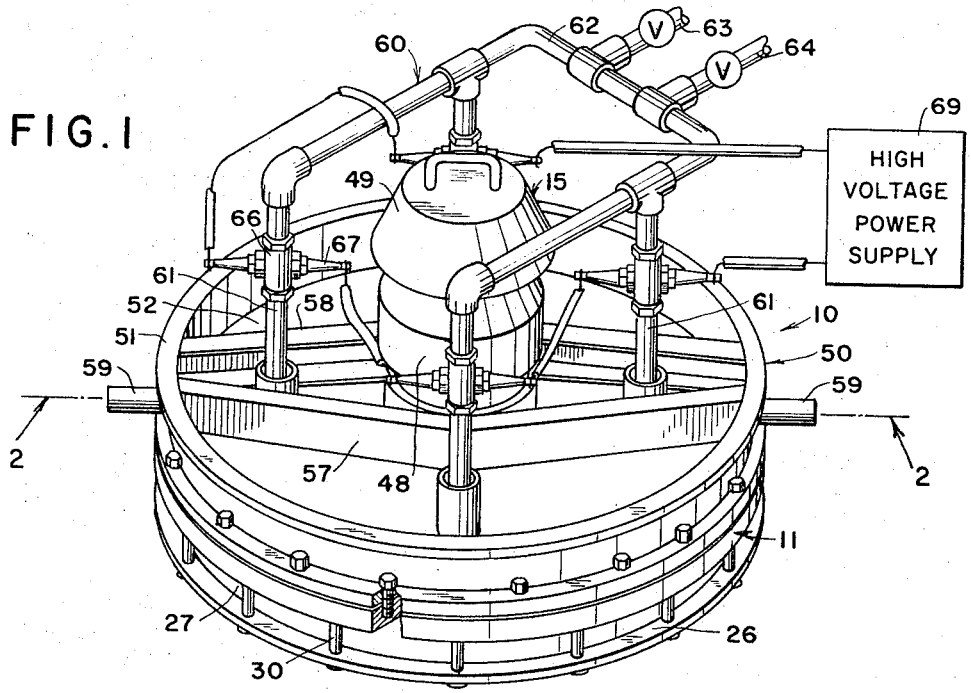
FIGURE 1 is an isometric view of a gas exploder constructed in accordance with my present invention.
Figure 2:
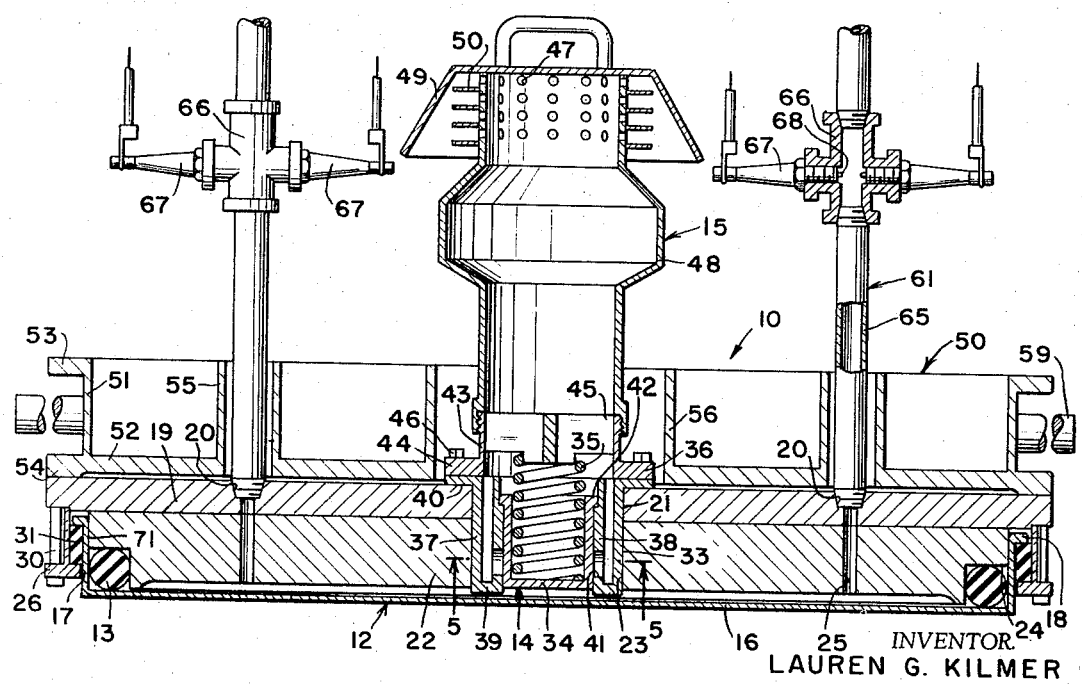
FIGURE 2 is a vertical section taken at line 2—2 in FIGURE 1.

Referring more particularly to FIGURES 1 and 2 the reference number 10 designates a gas exploder constructed in accordance with my present invention. Gas exploder 10 basically includes a top 11, a bottom 12, a sealing ring 13, a valve 14 and an exhaust stack 15.

Figure 3:
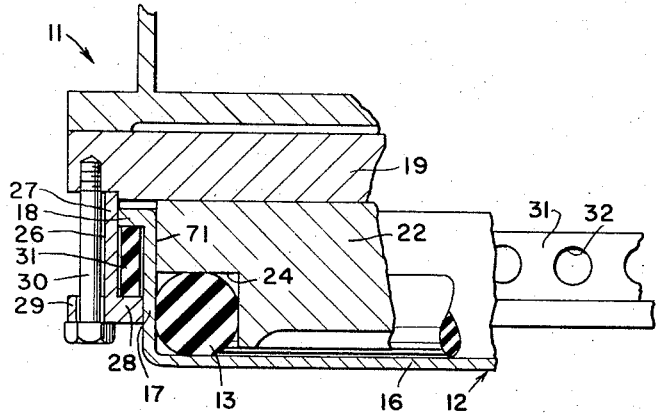
FIGURE 3 is an enlarged fragmentary view of a portion of the device as seen in FIGURE 2.
Figure 4:
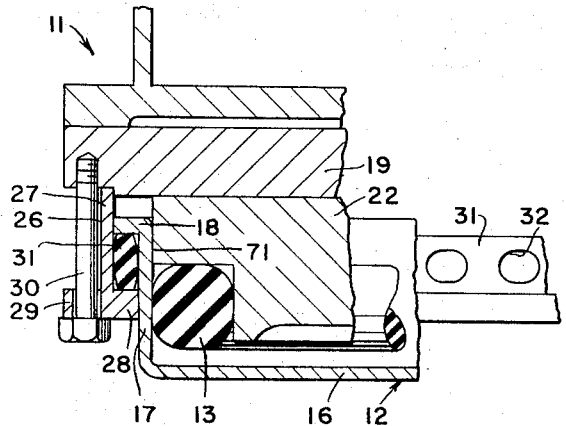
FIGURE 4 is a view similar to FIGURE 3 illustrating the operation of the seal of the present invention.
Figure 5:
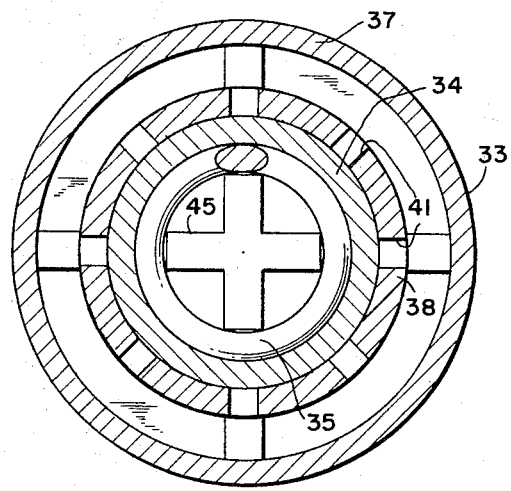
FIGURE 5 is a plan section taken at line 5—5 in FIGURE 2.

Referring also to FIGURES 3 and 4 bottom 12 includes a circular steel plate 16 which at its rim is provided with an integral, upstanding cylindrical flange 17 which at its upper end carries an integral, outwardly-extending, short, annular flange 18.

Top 11 includes an annular, thick-steel plate 19 having an outside diameter slightly larger than the outside diameter of flange 18 and is further provided with four small, tapped, vertical openings 20 disposed at 90° intervals about plate 19 approximately midway between its central opening 21 and its rim. Plate 19 carries a depending, coaxially positioned, generally annular, iron casting 22 which is welded to the underside of plate 19. Casting 22 is approximately of the same height as flange 17 on bottom plate 16 and has an outside diameter slightly less than htat of flange 17 such that top plate 19 can be positioned coaxially over bottom plate 16 with casting 22 inside flange 17 and spaced slightly inward of flange 17.

Casting 22 has an open center 23 approximately the same diameter as opening 21 and is stepped inwardly at its lower, outer edge to form an annular seat 24 sized to receive O-ring 13. Casting 22 is further provided with four vertical passages 25 which are disposed at 90° intervals about casting 22 and are positioned such that they coincide in location with tapped openings 20 in plate 19 with which they register.

Referring particularly to FIGURE 3 it will be noted that sealing ring 13, which is made of chloroprene rubber, is positioned resting on the top of bottom plate 16 just inside flange 17 such that seat 24 rests on it. Preferably the thickness of ring 13 is sufficient that the bottom of casting 22 slightly clears the top of bottom plate 16 and the sides of ring 13 are just tangent to the side of casting 22 below seat 24 and the inner side of flange 17.

Bottom 11 and top 12 are retained together by means of a hoop 26 positioned encircling flanges 17 and 18. Hoop 26, which has the cross-section of an inverted T, consists of a vertical, cylindrical portion 27 having inwardly and outwardly extending, annular flanges 28 and 29 at its lower end and is secured to the underside of the rim of plate 19 by means of a series of cap bolts 30 which extend upwardly through apertures disposed at intervals about outer annular flange 29 of hoop 26 with their shank ends threadedly received in correspondingly positioned tapped openings in the underside of the rim of plate 19 to hold hoop 26 firmly against the underside of plate 19.

The inside diameter of the cylindrical portion of hoop 26 is sized just to clear flange 18 on bottom 12 such that the inner annular flange 28 at the lower end of hoop 26 is spaced below and underlies flange 18 to receive a strip 31 of hard chloroprene rubber between hoop 26 and flange 17. Rubber strip 31 has cross-sectional dimensions generally filling the space between lower inner flange 28 on hoop 26 and flange 18. Strip 31, as will be most clearly seen in FIGURES 3 and 4 is provided with a series of circular slot 32 along its length.

Valve 14 includes a valve body 33, a piston (valve element) 34, a helical spring 35 and a spring retainer cage 36. Generally valve body 33 includes a pair of coaxial cylindrical walls 37 and 38, which are spaced from each other, are closed together at their lower ends by means of an interconnecting annular end wall 39 and are open at their upper ends. The outer sidewall 37 at its upper end is provided with an outwardly extending annular flange 40 and itself has a diameter just less than that of openings 21 and 23 such that valve body 33 can be positioned in openings 21 and 23 with flange 40 overlying the top of plate 19. Inner wall 38 has a machined inside surface which is counter-sunk at its upper end and which is provided with a series of apertures 41 adjacent its lower end providing communication between the annular space between walls 37 and 38 and the central opening of valve body 33 lying inside wall 38.

Piston 34 is a machined casting sized to fit snugly but slidingly within cylindrical wall 38 and has a flange 42 at its upper end received in the counter bore in the upper end of the interior of wall 38 to limit downward movement of piston 34 at a position in which the lower, closed end of piston 34 is flush with the underside of casting 22 when piston 34 is dropped into the central opening of valve body 33 from its upper ends.

Spring cage 36 is a short steel cylinder 43 which is threaded at its upper end and which has an outwardly projecting, annular flange 44 at its lower end and a pair of intersecting steel cross-plates in its upper interior portion forming a spider 45. The cylindrical portion 43 of spring cage 36 has the same inside diameter as sidewall 37 of valve body 33 and is positioned above valve body 33 with annular flange 44 on spring cage 36 overlying flange 40. Spring cage 36 is retained in such position by a series of cap bolts 46 received in apertures in flanges 40 and 44 which register with correspondingly disposed tapped bores about opening 21 in plate 19 such that helical spring 35 is retained snugly under compression between the underside of spider 45 and the upperside of the closed bottom of piston 34. The spacing of the flights of spring 35 in this position and the length of piston 34 is relation to the location of spider 45 is such that when piston 34 is displaced upwardly to the maximum compression of spring 35, apertures 41 in sidewall 38 are completely exposed to communicate the space confined between bottom 12 and top 11 with the annular space between walls 37 and 38 of valve body 33 and hence with the exterior of exploder 10 through spring cage 36. Muffler 15, which is of any conventional construction providing low-pass characteristics desirably having an upper cut-off frequency on the order of five cycles per second, is threadedly received at its open, lower end on the upper end of cylinder 43 of spring cage 36 and is provided with lateral openings 47 about its upper, closed end to permit venting of gases passing upwardly through valve 14 into muffler 15. Interiorly muffler 15 is hollow, in the illustrated case, and is centrally enlarged as indicated by the reference numeral 48. A frusto-conical deflector skirt 49 is mounted at the upper end of muffler 15 above openings 47 and extends downwardly and outwardly to below the level of openings 47. Optionally openings 47 can be disposed in several rows about the top of muffler 15 underlying deflector skirt 49, and the upper end of muffler 15 can be further provided with external annular baffles 50 positioned within deflector skirt 49 and spaced inwardly therefrom, each such baffle 50 being attached to muffler 15 between an adjacent pair of rows of openings 47.

It will be noted gas exploder 10, as illustrated in FIGURE 1-5, is further equipped with a shallow cylindrical tank 50 including, as a integral parts, a cylindrical sidewall 51, an annular bottom plate 52, outwardly extending, annular flanges 53 and 54 at the upper and lower ends of sidewall 51 respectively, and four upstanding sleeves 55 having their lower ends disposed in openings in plate 52 registering with openings 20 but having wider diameters than openings 20. In addition the central aperture of plate 52, which is wider than flanges 40 and 44 on valve body 33 and spring cage 36, is also provided with an integral, upstanding sleeve 56 the lower end of which is disposed in such central aperture. Tank 50 is further provided with a pair of slightly bowed braces 57 and 58 which are in juxtaposition with their adjacent end pairs close and welded to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent ends of braces 57 and 58. Stub shafts 59 can be used for carrying gas exploder 10 in a fork-type device. If desired, tank 50 can retain a lead casting within sidewall 51 for extra weight. In such case sleeves 55 and sleeve 56 serve to provide access to openings 20 and to valve 14.

Referring to FIGURES 1 and 2 gas exploder 10 further requires a gas charging and ignition system generally designated by the reference number 60. Charging and ignition system 60 basically includes four upstanding conduits 61 interconnected at their upper ends through a header 62 to separate valved connections 63 and 64 leading to storage cylinders respectively for propylene, or other suitable combustible gas, and for oxygen.

Each upstanding conduit 61 includes a pipe section 65 threadedly received at its lower end in a tapped aperture 20 in plate 19 and, threadedly received on the upper end of such pipe section 61, a four-way fitting 66. Header 62 generally includes suitable nipples, elbows and T's as well as pipe sections to provide a U-shaped connection communicating the upper openings of four-way fittings 66 with valved conduits 63 and 64 which are preferably connected to the bottom of the U.

Eight spark plugs 67 having their ground electrodes removed are connected, two to each four-way fitting 66, in the lateral openings of fittings 66 such that, as shown most clearly in FIGURE 2, the insulated electrodes 68 of each thusly associated pair of plugs 67 face each other in such fitting 66. Exteriorly eight spark plugs 67, thus mounted, are electrically connected in series across a suitable electrical supply 69 which is capable of impressing a high voltage, typically on the order of 70,000 volts, across serially interconnected spark plugs 67 at any desired instant in time.

In operation gas exploder 10 is located at a suitable location with bottom 12 resting on the ground at a spot clear of large stones and other undesirable structure. Typically spring 35 is under sufficient compression such that operation of piston 34 does not occur until a pressure within exploder 10 on the order of 30 p.s.i.g. has been reached.

Valved conduits 63 and 64 are then opened to admit propylene and oxygene until a pressure in exploder 10 on the order of 2 p.s.i.g. has been achieved. (It will be apparent that a stoichiometric mixture of oxygen and propylene are sought and that this is achieved quite simply by introducing the gases such that the partial pressures of each are in proportion to the molar ratio of a stoichiometric mixture, i.e., $4.5:1::O_2:C_3H_6$.)

With valved conduits 63 and 64 closed, exploder 10 is properly charged and an explosion can be initiated simply by actuating high voltage source 69 at the desired point in time, whereupon high potential is placed across the serial connection of the eight spark plugs 67. It will be apparent that in the event of any fouling of spark plugs 67 at least two active gaps from an electrode 68 to ground or another electrode 68 are nevertheless provided such that combustion of the mixture of gases within exploder 10 is initiated with a resultant explosion occurring substantially simultaneously with energization of plugs 67.

Noting FIGURE 3, which shows a section through seal 13 and the surrounding structure of gas exploder 10, when exploder 10 is charged the cross-section of sealing ring 13 is of substantially circular shape and the surfaces of flange 17, of plate 16 and of casting 22 are tangent to the exterior of ring 13. As the gases are exploded, however, subsequent to the initial shock wave of the explosion which creates the seismic wave of interest, the continued expansion of the exploding gases drives the weight of top 11 and its associated equipment upwardly relative to bottom 12 tending to compress resilient strip 31, which can so yield, although in a limited manner, since it is slotted as described above. At such time the pressure of the exploding gases forces sealing ring 13 tightly against the point 71 formed between the flange 17 and casting 22, as indicated in FIGURE 4, generally deforming ring 13 against such joint and at the same time lifting ring 13 with the rising structure supported on and by plate 19.

At the same time as relative movement of the bottom 12 and top 11 occurs, however, piston 34 is lifted at even faster rate to vent the interior of gas exploder 10 through valve 14 and muffler 15. This vent action is so rapid that normally the pressure is relieved and top 11 again collapses on botton 12 within a fraction of a second. Generally after such collapse, which collapse is cushioned by sealing ring 13, the pressure of unvented combustion gases remaining between top 11 and bottom 12 is substantially negative to atmospheric, being on the order of five p.s.i.a. Usually as a result, it is unnecessary in subsequent firing to purge the interior of gas exploder 10 when recharging, and recharging is so fast that respective firing at significantly rapid rates is feasible.

I claim:

1. A device for propagating a seismic wave at the surface of the earth including means defining a chamber having a rigid bottom and rigid top, a joint, defined between said top and bottom at their sides having clearances therebetween, means resiliently fastening said top to said bottom to permit limited vertical movement of said top relative to said bottom, and a resilient sealing ring disposed between said top and bottom on the inner side of said joint positioned against the clearances thereof.

2. A device according to claim 1 in which said joint is formed between a pair of telescoping members one said member being part of said top and the other said member being part of said bottom.

3. A device according to claim 2 in which said top telescoping member is positioned within said bottom telescopng member.

4. A device according to claim 1 which further includes a gas charging and igniting system including conduit means positioned above said top and connected thereto to provide external communication to said chamber and a pair of insulated electrodes positioned in said conduit means to define a spark gap therein.

5. A device according to claim 1 which further includes a gas charging and igniting system including conduit means positioned above said top having a plurality of connections thereto to provide external communication to said chamber, a pair of insulated electrodes positioned in each said conduit connection to define a spark gap therein, and means interconnecting said electrodes whereby said spark gaps are electrically connected in series.

6. A device according to claim 1 which further includes exhaust means including means defining an opening in said top providing external communication to said chamber, and normally closed valve means positioned in said opening to close said communication therethrough and operable upon a predetermined increase in pressure in said chamber to open thereby communicating said chamber with the exterior of said device.

7. A device for propagating a seismic wave at the surface of the earth comprising means defining a chamber having a rigid top and a rigid bottom, a pair of telescoping members defining therebetween a joint at their sides having clearances therebetween, one of said members being part of said top and the other said member being part of said bottom, means resiliently fastening said top to said bottom permitting limited vertical movement of said top relative to said bottom, a resilient sealing ring disposed between said top and said bottom on the inner side of said joint positioned against the clearances between said members, a gas charging and igniting system including conduit means positioned above said top and connected thereto to provide external communication to said chamber and a pair of insulated electrodes positioned in said conduit means to define a spark gap therein, and exhaust means including means defining an opening in said top providing external communication to said chamber and normally closed valve means positioned in said opening to close said communication therethrough and operable upon a predetermined increase in pressure in said chamber to rapidly open thereby communicating said chamber with the exterior of said device.

8. A device for propagating a seismic wave at the surface of the earth including means defining a chamber having a rigid bottom and rigid top, a joint defined between said top and bottom at their sides having clearances therebetween, means resiliently fastening said top to said bottom to permit limited vertical movement of said top relative to said bottom, and a resilient sealing ring disposed between said top and bottom on the inner side of said joint positioned against the clearances thereof, said ring being positioned on said bottom and said top being positioned resting on said ring.

References Cited by the Examiner
UNITED STATES PATENTS

| | | | |
|---|---|---|---|
| 1,753,368 | 4/1930 | Du Bois-Reymond et al. | 181—.5 |
| 2,203,140 | 6/1940 | Green | 181—.5 |
| 3,029,733 | 4/1962 | McElroy | 181—.5 |
| 3,044,452 | 7/1962 | McCrory et al. | 181—.5 |
| 3,048,816 | 8/1962 | Lubnow | 181—.5 |
| 3,198,282 | 8/1965 | Dunaway | 181—.5 |
| 3,235,027 | 2/1966 | Kilmer | 181—.5 |
| 3,260,327 | 7/1966 | McCollum | 181—.5 |

BENJAMIN A. BORCHELT, *Primary Examiner.*

W. KUJAWA, *Assistant Examiner.*